(12) United States Patent
Van Maanen et al.

(10) Patent No.: US 9,067,599 B2
(45) Date of Patent: Jun. 30, 2015

(54) TRANSMISSION OIL PRESSURE CONTROL DURING ENGINE AUTOSTART

(71) Applicant: GM GLOBAL TECHNOLOGY OPERATIONS LLC, Detroit, MI (US)

(72) Inventors: Keith D. Van Maanen, Birmingham, MI (US); Roger Joseph Rademacher, Holt, MI (US); Craig J. Hawkins, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 24 days.

(21) Appl. No.: 13/785,413

(22) Filed: Mar. 5, 2013

(65) Prior Publication Data

US 2014/0257607 A1    Sep. 11, 2014

(51) Int. Cl.
*B60W 20/00* (2006.01)
*F16H 61/00* (2006.01)
*B60W 10/06* (2006.01)
*B60W 10/30* (2006.01)
*B60W 30/18* (2012.01)

(52) U.S. Cl.
CPC ............ *B60W 20/40* (2013.01); *Y10S 903/902* (2013.01); *B60W 10/06* (2013.01); *B60W 10/30* (2013.01); *B60W 30/18018* (2013.01); *F16H 61/0021* (2013.01); *B60W 2710/1083* (2013.01)

(58) Field of Classification Search
CPC ............................... F02N 11/08; B60W 10/02
See application file for complete search history.

(56) References Cited

U.S. PATENT DOCUMENTS

| | | | |
|---|---|---|---|
| 5,415,603 A | * | 5/1995 | Tuzuki et al. ................. 477/5 |
| 2009/0017988 A1 | * | 1/2009 | Reuschel ..................... 477/167 |
| 2009/0138130 A1 | * | 5/2009 | Aigner et al. ................ 700/282 |
| 2010/0038158 A1 | * | 2/2010 | Whitney et al. .......... 180/65.265 |
| 2010/0227735 A1 | * | 9/2010 | Sah et al. ........................ 477/5 |

* cited by examiner

*Primary Examiner* — John R Olszewski
*Assistant Examiner* — Jason Roberson
(74) *Attorney, Agent, or Firm* — Quinn Law Group, PLLC

(57) ABSTRACT

A vehicle includes an engine having autostart functionality, a source of fluid pressure when the engine is off, a flow control solenoid that outputs a variable clutch pressure, a transmission, an electric motor, and a controller. The transmission includes a clutch in fluid communication with the solenoid. The clutch applies via the clutch pressure to establish a first gear launch state. The motor is powered via a rechargeable energy storage system. The controller executes a method to transmit pulse width modulation (PWM) control signals to the solenoid upon detection of a set of conditions triggering the autostart event to lower clutch pressure to a first calibrated level. Restart of the engine is commanded, and the clutch pressure increases toward a second calibrated level while engine speed is increasing. The controller discontinues the PWM control signals and increases clutch pressure to line pressure when the input speed exceeds a calibrated threshold.

20 Claims, 2 Drawing Sheets

TRANSMISSION OIL PRESSURE CONTROL DURING ENGINE AUTOSTART

TECHNICAL FIELD

The present disclosure relates to transmission oil pressure control during an engine autostart.

BACKGROUND

Hybrid electric vehicles (HEVs) selectively utilize different prime movers, which typically include an internal combustion engine and one or more electric fraction motors, at different points in a drive cycle. A vehicle having a full hybrid powertrain can utilize torque from either or both of the engine and the traction motor(s) for vehicle propulsion. As a result, a vehicle having a typical full HEV powertrain can be electrically propelled immediately upon vehicle launch and while traveling below a threshold vehicle speed. Above the threshold vehicle speed, the engine is automatically started and engaged with a transmission input member.

By way of contrast, the powertrain of a mild HEV lacks the capability of propelling the HEV by purely electrical means. Nevertheless, a mild HEV powertrain retains key design features of the full HEV powertrain described above. Such design features include the capability of automatically shutting off the engine at idle to conserve fuel, and then automatically restarting the engine when needed. In a typical "driver-requested" engine autostart event, the engine automatically restarts when the driver directly requests output torque, usually by removing pressure applied to a brake pedal and/or a threshold amount of throttle request. However, other engine autostart events may be triggered solely by certain vehicle state changes such as a low battery state of charge. As such restart events occur regardless of a driver's input, they are often referred to as "non driver-requested" autostart events.

SUMMARY

A vehicle is disclosed herein that includes an engine, a transmission, and a controller, as well as a source that provides fluid pressure to the transmission when the engine is off after an engine autostop event. The transmission includes a designated clutch that is used for launching the vehicle. Pressure control to the designated clutch is provided by a fluid control solenoid, e.g., a variable force solenoid (VFS) valve. The fluid control solenoid, which is in fluid communication with the source, outputs a variable clutch pressure during an engine autostart event. The designated clutch is applied via the variable clutch pressure, which is lower than line pressure to the transmission, in order to establish the launch state, e.g., $1^{st}$ gear launch. After the engine has restarted, the designated clutch is controlled at line pressure, which at all times is equal to or exceeds the variable clutch pressure. The rate at which the variable clutch pressure is increased via the controller is a calibration value which can be tailored to provide the desired hydraulic damping response during restart.

In order to precisely control the variable clutch pressure, the controller may transmit or command pulse width modulation (PWM) control signals to the flow control solenoid upon detection, by the controller, of a predetermined set of conditions triggering the engine autostart event. The PWM control signals effectively decrease the duty cycle of the flow control solenoid and thereby reduce the variable clutch pressure to a calibrated low level. The controller then commands an automatic restart of the engine, determines an input speed to the transmission while the engine is increasing in speed, and discontinues transmitting the PWM control signals to the flow control solenoid when the input speed to the transmission exceeds a calibrated threshold.

In another embodiment, the engine has non driver-requested autostart functionality, the source is an auxiliary pump operable to provide fluid pressure at a first level when the engine is off, and the designated clutch is applied via the clutch pressure at a second level to establish a $1^{st}$ gear launch state of the transmission. The vehicle includes a hydrodynamic torque converter having an impeller connected to the engine and a turbine connected to an input member of the transmission. A sensor measures a rotational speed of the turbine. Motor torque from a high-voltage electric traction motor, which is powered via a high-voltage rechargeable energy storage system rated for at least 60 VDC, is used to restart the engine.

In this particular embodiment, the controller transmits, or commands transmission of, the PWM control signals to the flow control solenoid upon detection, by the controller, of a predetermined set of conditions triggering the non-driver requested autostart event. This may include detecting an apply pressure to each of a brake pedal and an accelerator pedal and a state of charge of the RESS.

A method is also disclosed herein. The method may include detecting a set of conditions in a vehicle having an engine with autostart functionality, and then transmitting PWM control signals to a flow control solenoid upon detection of the set of conditions. The flow control solenoid is in fluid communication with a source of fluid pressure. The method includes lowering the clutch pressure to a calibrated first level via the PWM signals, commanding an automatic restart of the engine via an electric motor, and then determining an input speed to the transmission while the engine is increasing in speed. Clutch pressure is thereafter increased to a second level while engine speed is actively increasing. The PWM control signals to the flow control solenoid are discontinued while increasing the variable clutch pressure at a calibrated rate to full line pressure when the input speed to the transmission exceeds a calibrated threshold such that the clutch pressure is set at the second level. In this manner, the present control approach hydraulically dampens noise, vibration, and harshness during a non-driver requested engine restart.

The above features and advantages and other features and advantages of the present invention are readily apparent from the following detailed description of the best modes for carrying out the invention when taken in connection with the accompanying drawings.

DETAILED DESCRIPTION

Figure 1:
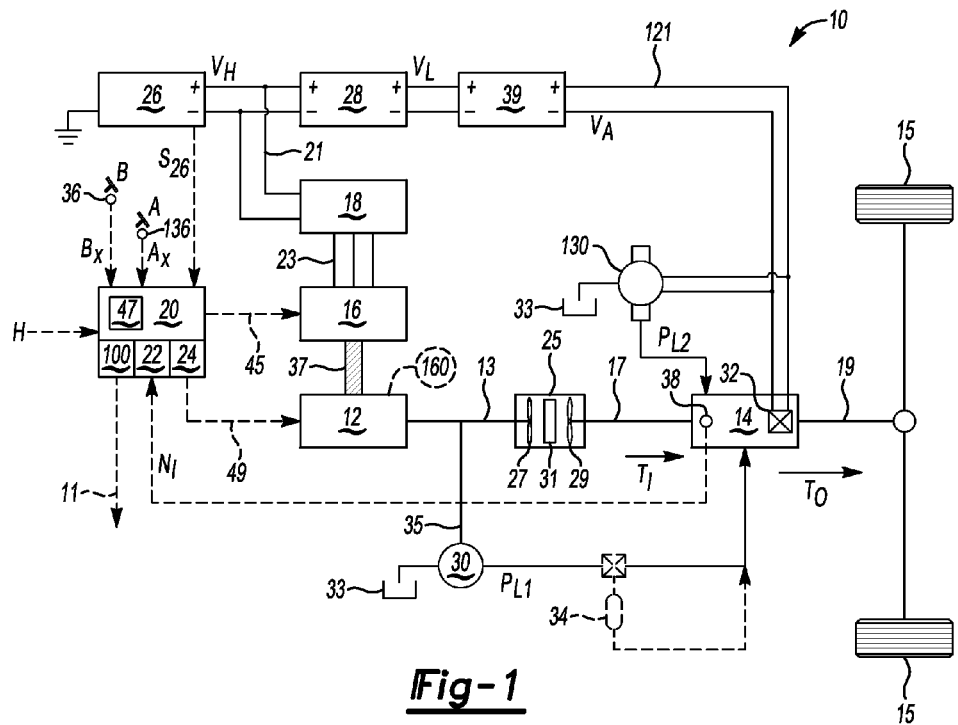
FIG. 1 is a schematic illustration of an example vehicle having a transmission and a controller which controls oil pressure to a designated transmission clutch during an engine autostart event.
Figure 3:
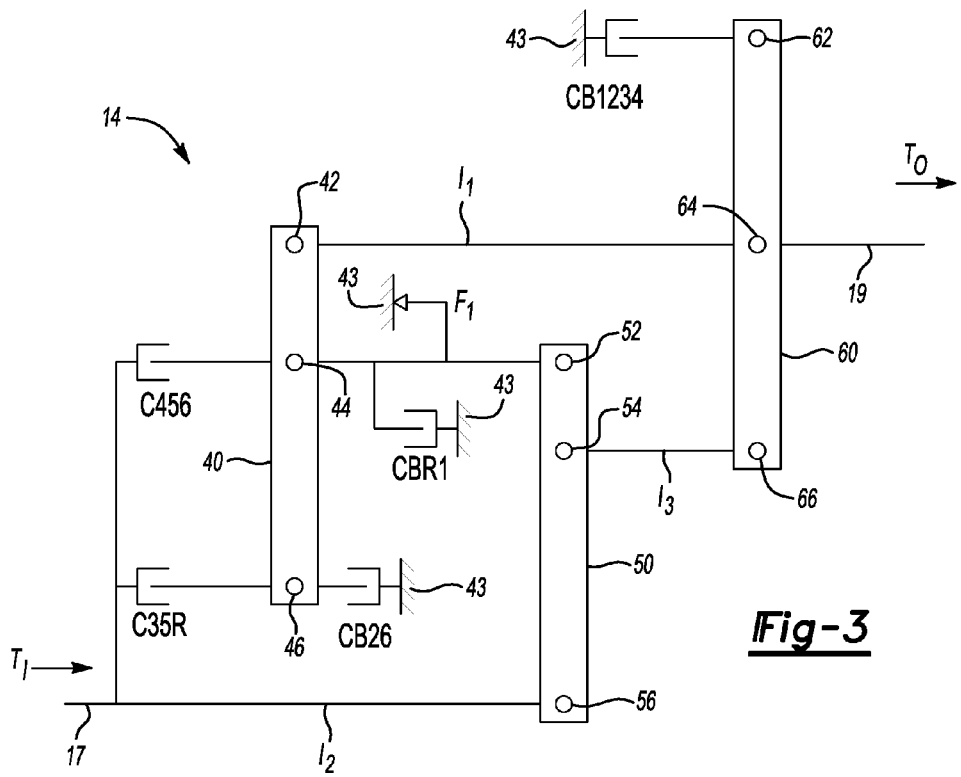
FIG. 3 is a schematic lever diagram describing an example 6-speed front wheel drive transmission that may be used with the vehicle shown in FIG. 1.

Referring to the drawings, wherein like reference numbers refer to like components throughout the several views, FIG. 1 shows an example vehicle 10 that includes an internal combustion engine 12 and a transmission 14. An example embodiment of the latter is shown in FIG. 3 and described in further detail below. The engine 12 has automatic stop/start functionality, i.e., the capability of automatically shutting off at idle and restarting again in both driver-requested and non driver-requested autostart events. In the example configuration of FIG. 1, motor torque from a high-voltage motor generator unit (MGU) 16 may be used to selectively rotate a belt 37 of the engine 12, or a flywheel or other suitable portion thereof, thereby cranking and starting the engine 12. In other embodiments, an auxiliary starter motor 160 as shown in phantom may be used for the same purpose.

Auxiliary hydraulic line pressure (arrow $P_{L2}$) may be maintained in an engine-off state via an auxiliary fluid pump 130, for instance an electric pump. In another embodiment, an optional accumulator 34 may be hydraulically charged via a main pump 30 driven via a shaft 35 by the engine 12. As the shaft 35 rotates, reciprocating motion of a cam (not shown) may cause the main pump 30 to circulate fluid from a sump 33, with the accumulator 34 used in lieu of, or in addition to, the auxiliary pump 130 during engine-off periods. Alternatively, the engine-driven main pump 30 may be dispensed with altogether in favor of the auxiliary pump 130. When the main pump 30 is used, hydraulic line pressure (arrow $P_{L1}$) is provided to the transmission 14 whenever the engine 12 is running, with the greater capacity of the engine-driven main pump 30 ensuring that hydraulic line pressure (arrow $P_{L1}$) always equals or exceeds the level of the auxiliary hydraulic line pressure (arrow $P_{L2}$).

As used herein, the term "driver-requested autostart event" refers to an engine autostart event that requires action to be taken by a driver of the vehicle 10, such as removal of apply pressure to a brake pedal B. To facilitate driver-requested autostarts, a brake pedal sensor 36 may be connected to the brake pedal B and used to measure the braking force and/or travel of the brake pedal B. Such a sensor 36 may then output a braking signal (arrow Bx) to a controller 20.

The term "non driver-requested autostart event" in turn describes any automatic engine restart event occurring absent an action on the part of the driver to command a restart. For instance, conditions for a non driver-requested autostart may include a state in which the brake pedal B remains depressed while an accelerator pedal A is not depressed. Restart of the engine 12 is automatically commanded due to other changing vehicle parameters. As with the brake pedal B, the accelerator pedal A may have a sensor 136 which measures the apply force/travel of the accelerator pedal A, and which transmits a throttle signal (arrow Ax) to the controller 20.

Parameters signaling for a non driver-requested restart of the engine 12 may include, for instance, a state of charge (arrow $S_{26}$) of a rechargeable energy storage system (RESS) 26 dropping below a calibrated minimum threshold, or alternatively a state of charge of an auxiliary battery 39 when the MGU 16 is not used for cranking and starting of the engine 12. Other parameters may include heating, ventilation, and air conditioning (HVAC) request signals (arrow H) and/or other parameters, e.g., a timeout condition, a hardware limitation, etc. The HVAC request signals (arrow H) may be automatically determined, for instance by measuring the temperature of a given fluid-cooled device and/or of a cooling medium in a cooling circuit (not shown) of the vehicle 10, or via detection of a particular vehicle climate setting. The controller 20, in executing code embodying the method 100, may also transmit a motor control signal (arrow 45) to the MGU 16 to command output torque from the MGU 16, or alternatively to the auxiliary starter motor 160 when that device is used, and an engine control signal (arrow 49) to the engine 12 to control engine speed during cranking and starting of the engine 12.

The controller 20 shown in FIG. 1 may include one or more processors 22, transceivers 47, and tangible, non-transitory memory 24 on which instructions are recorded for executing a method 100 for controlling oil pressure, via pulse width modulation (PWM) control signals (arrow 11), to a flow control solenoid 32 for a designated clutch of the transmission 14. An example of such a clutch is described below with reference to FIG. 3. Pressure control is affected in particular during a non-driver commanded engine restart event, in such a manner as to reduce driveline vibration. The recorded instructions describe the required steps of the method 100, an example of which is described below with reference to FIG. 4. Vehicle parameters controlled or used in the execution of the method 100 are also discussed in detail below with reference to FIG. 5.

Figure 2:
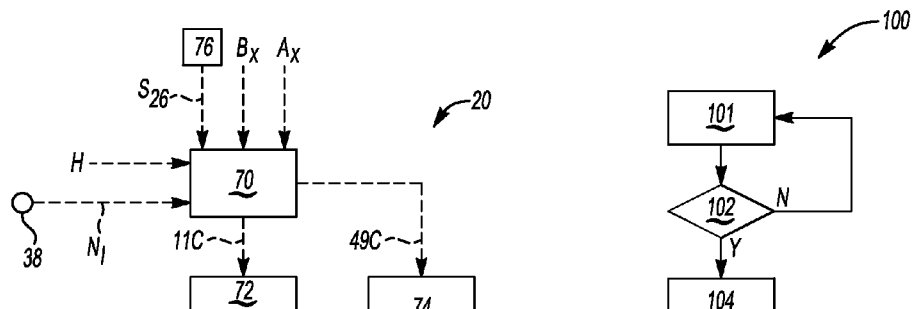
FIG. 2 is a schematic logic flow diagram for a controller usable with the vehicle shown in FIG. 1.

Referring briefly to FIG. 2, in a particular configuration the controller 20 of FIG. 1 may include multiple control modules each having corresponding hardware and software which together perform corresponding functions, possibly executed at faster or slower process loop speeds relative to the other control modules. For example, a top-level hybrid control module 70 may be in communication with a transmission control module (TCM) 72, an engine control module (ECM) 74, and a battery control module (BCM) 76. While omitted from FIG. 2 for illustrative clarity, each control module 70, 72, 74, and 76 may include one or more of the processors 22, memory 24, and transceivers 47 as shown in FIG. 1.

In the embodiment of FIG. 2, the top-level control module 70 may receive as inputs the braking signals (arrow Bx), accelerator/throttle signals (arrow Ax), a transmission input speed signal (arrow $N_I$) from a speed sensor 38, and the HVAC request signals (arrow H). Depending on the values of the received signals, the top-level control module 70 may output a PWM control signal command (arrow 11C) to the TCM 72, and possibly an engine speed control command (arrow 49C) to the ECM 74. The TCM 72 may include a set of semiconductor switches 75, e.g., IGBTs or MOSFETs, which are rapidly switched in response to the PWM control signal command (arrow 11C) to thereby vary, via the PWM control signals (arrow 11), the duty cycle of the flow control solenoid 32. Likewise, the ECM 74 may respond by outputting engine control signals (arrow 49) to the engine 12.

Referring again to FIG. 1, the engine 12 includes a driveshaft 13 which is selectively coupled with an input member 17 of the transmission 14 via a hydrodynamic torque converter 25. As is well understood in the art, a torque converter includes a driving member, i.e., a pump/impeller 27 connected to the drive shaft 13, a driven member/turbine 29, and a stator 31 configured to redirect fluid within the torque converter 25. The rotational speed of the turbine 29 may be measured via a transmission input speed sensor, e.g., the speed sensor 38 noted above with reference to FIG. 2.

The torque converter 25 fluidly couples the engine 12 to the transmission 14 and provides necessary torque multiplication at lower vehicle speeds. Input torque (arrow $T_I$) into the transmission 14 is delivered via the input member 17, while output torque (arrow $T_O$) from the transmission 14 is ultimately transferred to an output member 19, and from there to a set of drive wheels 15. While only one set of drive wheels 15 is shown for illustrative simplicity, other embodiments may power additional drive wheels 15.

The MGU 16 of FIG. 1 may be configured as a multi-phase electric machine having a relatively high voltage ($V_H$) of approximately 60 volts to 300 volts or more depending on the design. The MGU 16 is electrically connected to the RESS 26 via a DC bus 21, a power inverter module (PIM) 18, and an alternating current (AC) bus 23. The RESS 26, which may be a multi-cell lithium ion or other suitable battery pack in a possible embodiment, may be selectively recharged by capturing energy during regenerative braking, as is well known in the art.

The vehicle 10 may also include an auxiliary power module (APM) 28, i.e., a DC-DC power converter that outputs a voltage at a suitable lower voltage level ($V_L$), which is electrically connected to the RESS 26 via the DC bus 21. The APM 28 is electrically connected to the auxiliary battery 39, for instance a 12-15 volt DC battery, such that relatively high-voltage power from the RESS 26 is reduced to suitable auxiliary voltage levels ($V_A$) by operation of the APM 28. As shown, the flow control solenoid 32 within the transmission 14 may be powered via the auxiliary voltage ($V_A$) over an auxiliary voltage bus 121. The PWM control signals (arrow 11) thus vary the duty cycle of the flow control solenoid 32 to cause the flow control solenoid 32 to set itself to a particular position inclusive of fully open, fully closed, and anywhere in between.

The controller 20 of FIG. 1 may be configured as a single or, as shown in FIG. 2, a distributed control device. The controller 20 is electrically connected to or otherwise in hard-wired or wireless communication with each of the engine 12, the MGU 16, the RESS 26, the APM 28, and the PIM 18 via suitable control channels, e.g., a controller area network (CAN) or serial bus, including for instance any required transfer conductors, whether hard-wired or wireless, sufficient for transmitting and receiving the necessary electrical control signals for proper power flow control and coordination aboard the vehicle 10.

Additionally, the physical hardware embodying the controller 20 may include one or more digital computers having the processor 22 and memory 24 noted above, e.g., read only memory (ROM), flash memory, optical memory, random access memory (RAM), electrically-erasable programmable read only memory (EEPROM), a high-speed clock, analog-to-digital (A/D) and digital-to-analog (D/A) circuitry, and input/output (I/O) circuitry and devices, including one or more transceivers 47 for receiving and transmitting any required signals in the execution of method 100, as well as appropriate signal conditioning and buffer circuitry. Any computer-executable code resident in the controller 20 or accessible thereby can be stored in the memory 24 and executed via the processor(s) 22 to provide the functionality set forth herein.

Referring to FIG. 3, an example embodiment of the transmission 14 is shown as a 6-speed front wheel drive transmission in a schematic lever diagram, in which variable pressure control as described herein is accomplished for a braking clutch CB1234. Other transmission configurations with fewer or more gear states may be envisioned. In the particular embodiment of FIG. 3, the transmission 14 includes three gear sets 40, 50, and 60, each of which is depicted schematically as a corresponding lever. Each gear set 40, 50, and 60 has three nodes, each of which may be embodied, for a given planetary gear set configuration, as one of a ring gear, a sun gear, or a planetary carrier. Various rotating and braking clutches are used to establish the desired gear ratios for the transmission 14.

The rotating clutches in FIG. 3 include clutches C456 and C35R. The braking clutches include clutches CB1234, CBR1 with a freewheeling element F1, and CB26. As used herein, the nomenclature "C" refers to rotating clutch and "B" refers to braking clutch. Additionally, the numerals "1-6" refer to the gear state established by application of that particular clutch, i.e., $1^{st}$-$6^{th}$ gear (1-6) and reverse (R). Once again, in the example embodiment of FIG. 2, the clutch CB1234 may act as the designated transmission clutch whose pressure is controlled during a predetermined engine restart event using the method 100 of FIG. 4.

The first gear set 40 of FIG. 3 has nodes 42, 44, and 46. The second gear set 50 has nodes 52, 54, and 56. Likewise, the third gear set 60 includes nodes 62, 64, and 66. The input member 17 carrying the input torque (arrow $T_I$) may be selectively connected to nodes 44 and 46 via the clutches C456 and C35R, respectively. Node 42 is directly and continuously connected to node 64 of gear set 60 via an interconnecting member $I_1$. Node 44 is selectively connected to a stationary member 43 of the transmission 14 via clutch CBR1, with the freewheeling element F1 preventing rotation with respect to a node 52 of gear set 50 in one rotational direction.

Gear set 50 includes the node 52 along with nodes 54 and 56. Node 56 is directly and continuously connected to the transmission input member 17 via another interconnecting member $I_2$. Node 54 is directly and continuously connected to node 66 of gear set 60 via yet another interconnecting member $I_3$. Node 62 of gear set 60 is selectively connected to the stationary member 43 via the clutch CB1234, and node 64 is connected to the output member 19. As such, node 64 carries output torque (arrow $T_O$) to the drive wheels 15 shown in FIG. 1. Other configurations of the transmission 14 may be envisioned having more or fewer speeds without departing from the intended inventive scope.

Figure 4:
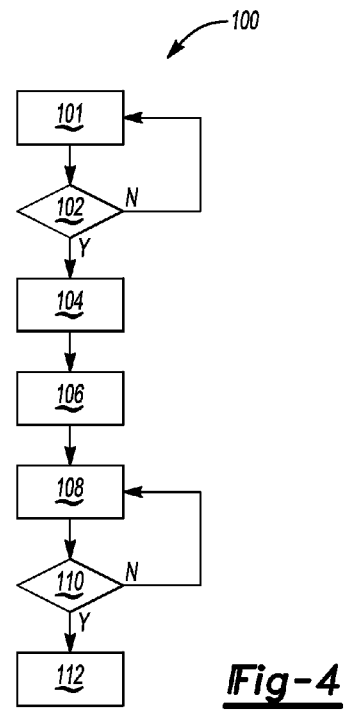
FIG. 4 is a flow chart describing a method for controlling oil pressure to a designated transmission clutch during an engine restart event in the vehicle shown in FIG. 1.

Referring to FIG. 4 in conjunction with the structure shown in FIG. 1, an example embodiment of the present method 100 begins with step 101. Conditions for executing a predetermined autostart event are measured and recorded via the controller 20. For example, when the predetermined autostart event is a non driver-requested autostart, the controller 20 may receive and process the braking signals (arrow Bx) and the accelerator signals (arrow $A_X$) to determine whether a driver of the vehicle 10 is presently depressing the brake pedal B and not depressing the accelerator pedal A. Additional vehicle parameters considered as part of step 101 may include a state of charge of the RESS 26, as determined by receipt by the transceiver 47 of the state of charge (arrow $S_{26}$) from the BCM 76 of FIG. 2, HVAC request signals (arrow H), and/or other factors requiring an automatic restart of the engine 12.

While a non driver-requested restart benefits from the present approach, given the often unexpected nature of such a restart from the perspective of a driver, other restart events may also be improved. While not shown in FIG. 4, exit conditions may be implemented at a higher control loop speed to ensure that, should a driver of the vehicle 10 request output torque (arrow $T_O$) during the execution of method 100, the requisite control logic can default to the hydraulic line pressure ($P_{L1}$) immediately or at a calibrated ramp rate. Once the signals representing the required set of conditions has been received and processed by the controller 20, the method 100 proceeds to step 102.

Step 102 entails comparing the received signals from step 101 to calibrated thresholds, which may be pre-recorded in memory 24 of the controller 20, in order to determine whether or not the predetermined restart event is required. If so, the method 100 proceeds to step 104. Otherwise, step 101 is repeated.

At step 104, the controller 20 of FIGS. 1 and 2 next calculates and outputs the PWM control signals (arrow 11) to transmit to the flow control solenoid 32 for the designated transmission clutch. The designated transmission clutch is any clutch whose oil feed must flow through the flow control solenoid 32, and that must be applied to launch the vehicle 10 after restart of the engine 12.

In the example transmission 14 shown in FIG. 2, the designated clutch may be clutch CB1234. Other designs may use a different clutch for $1^{st}$ gear launch, and perhaps more than one clutch. The result of step 104 is a controlled reduction in clutch pressure to the designated clutch, with the changing vehicle parameters explained in further detail below with reference to FIG. 5. As part of step 104, the controller 20 receives the transmission input speed signal (arrow $N_I$ of FIG. 1) from the speed sensor 38. The method 100 then proceeds to step 106.

Step 106 entails transmitting a motor control signal (arrow 49) to the MGU 16, or alternately to the PIM 18, commanding a restart of the engine 12. Upon receipt of the motor control signals (arrow 45), the MGU 16 is energized via high-voltage AC bus 23. The MGU 16 begins to apply motor output torque to the belt 37. Rotation of the belt 37 in turn cranks the engine 12. In other embodiments forgoing the MGU 16, an auxiliary motor may be used for the same purpose. As the engine 12 cranks, the method 100 proceeds to step 108.

At step 108, the controller 20 gradually increases engine speed to slip the designated clutch at a calibrated rate. Step 108 may include transmitting engine control signals (arrow 49) to the engine 12, e.g., via the ECM 74 of FIG. 2. Engine speed may be controlled by any suitable means, e.g., active spark retarding. The method 100 then proceeds to step 110.

At step 110, the controller 20 next determines if the transmission input speed (arrow $N_I$) has reached a calibrated speed threshold. Step 110 may include referencing a recorded value in memory 24. Step 108 is repeated if the calibrated speed threshold has not been reached. Otherwise, step 112 is repeated.

Step 112 may entail discontinuing the PWM control signals (arrow 11) initiated at step 104 to thereby allow full pressure to resume to the designated clutch. Step 112 may also include ramping clutch pressure at a calibrated rate up to full line pressure. In a design in which the optional accumulator 34 is used, step 112 may coincide with the engine-driven main pump 30 of FIG. 1 coming back online after a restart and subsequent exhausting of the accumulator 34. Alternatively, in a vehicle design lacking the engine-driven main pump 30, the auxiliary pump 130 may be controlled at this point of the method 100 with the control solenoid 32 fully open to thereby fully pressurize the designated transmission clutch.

Figure 5:
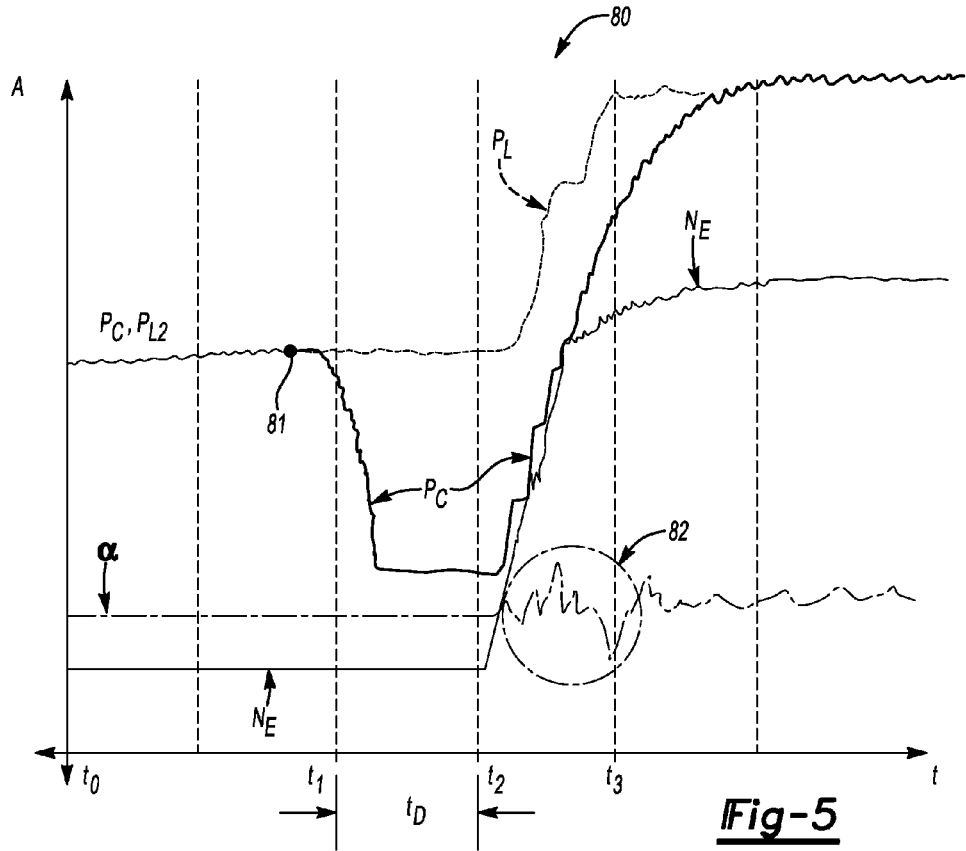
FIG. 5 is a set of traces describing changing vehicle parameters during a non-driver commanded engine restart controlled in accordance with the method of FIG. 3.

Referring to FIG. 5, the effect of execution of the method 100 on various vehicle parameters is shown via a set of traces 80, with amplitude (A) plotted on the vertical axis and time (t) plotted on the horizontal axis. At $t_0$, with the engine 12 off, transmission line pressure (trace $P_{L2}$) remains on at a lower pressure relative to that which occurs when the engine 12 is off. Such a pressure may be provided via the auxiliary pump 130 of FIG. 1. Clutch pressure (trace $P_C$) to the designated clutch is, at this point in time, at the same level as auxiliary line pressure (trace $P_{L2}$).

Shortly before $t_1$, the engine 12 is commanded by the controller 20 to restart in response to the detected conditions, as described above with reference to steps 101 and 102 of FIG. 4. Receipt of the PWM control signals (arrow 11) in step 104 of FIG. 4 reduces the duty cycle of the flow control solenoid 32 and thereby causes pressure to the designated clutch to drop at a controlled or calibrated rate. In a conventional approach, at the same point in time, i.e., point 81, pressure to the dedicated clutch would begin to increase with rising transmission line pressure (trace $P_{L1}$) in anticipation of the restart event, which does not occur here. After a short delay ($t_D$) after $t_1$, the engine 12 begins to crank by virtue of rotation of the belt 37, line pressure (trace $P_L$) begins to rise with rising speed (arrow $N_E$). The delay ($t_D$) represents a momentary delay as pressure falls to its required lower level at $t_2$. Beginning at $t_2$, clutch pressure (trace $P_C$) is ramped, stepped, or otherwise increased at a calibrated rate up to the level of line pressure (trace $P_L$).

Drivelines disturbances may begin to be experienced as engine speed (trace $N_E$) continues to rise. Such disturbances are represented as acceleration values (trace a), and are most noticeable in zone 82 at the initial phase of engine restart. However, the amplitudes of the peaks in zone 82 may be considerably lower than in conventional approaches due to the use of the targeted PWM control of the flow control solenoid 32 described herein. This allows the active pressure control to act as a type of hydraulic damper during engine restart. Upon restart of the engine 12 at $t_3$, pressure to the designated clutch is increased at a calibrated rate to the level of the transmission line pressure (trace $P_{L1}$) as shown. The actual point in time at which PWM control over the control solenoid 32 ceases may be, as explained above, determined via the transmission input speed (arrow $N_I$), e.g., as an amount of slip across the torque converter 25.

As will be appreciated by those having ordinary skill in the art, execution of the method 100 described above in any hybrid electric vehicle may reduce vibration during engine restart. Particular benefit may be realized during non driver-requested restarts, which typically prove challenging to control for optimum drive quality. Higher quality autostart events as a result of implementing the present invention may enhance driver satisfaction. While a short delay ($t_D$ of FIG. 5) results from the use of the present control approach, the resultant reduction in driveline disturbances during restart may be an acceptable tradeoff.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine having autostart functionality;
   a source operable to provide fluid pressure when the engine is off;
   a flow control solenoid in fluid communication with the source, wherein the flow control solenoid is configured to output a variable clutch pressure;
   a transmission having a stationary member, a gear set, an output member, and a designated clutch in fluid communication with the flow control solenoid, wherein the designated clutch is applied via the variable clutch pressure after restart of the engine to connect the gear set to the stationary member and to thereby launch the vehicle;
   an electric motor;
   drive wheels connected to the output member of the transmission; and
   a controller having a processor and tangible, non-transitory memory on which is recorded instructions for controlling the variable clutch pressure to the designated clutch during a predetermined autostart event of the engine, wherein execution of the instructions by the processor causes the controller to:
   transmit a set of pulse width modulation (PWM) control signals to the flow control solenoid in response to a predetermined set of conditions triggering the predetermined autostart event to thereby lower the variable clutch pressure to a calibrated level;
command an automatic restart of the engine via the electric motor;
determine an input speed to the transmission while the engine is actively increasing in speed; and
discontinue transmitting the set of PWM control signals to the flow control solenoid while increasing the variable clutch pressure at a calibrated rate to full line pressure, thereby applying the designated clutch to connect a node of the gear set to the stationary member to thereby transmit output torque from the transmission, via another node of the gear set, to the drive wheels of the vehicle via the output member and launch the vehicle, when the input speed to the transmission exceeds a calibrated threshold.

2. The vehicle of claim 1, further comprising:
a hydrodynamic torque converter connected to the engine and to an input member of the transmission; and
an input speed sensor in communication with the controller;
wherein the input speed sensor measures a rotational speed of a turbine of the torque converter to determine the input speed.

3. The vehicle of claim 1, wherein the source is an auxiliary fluid pump.

4. The vehicle of claim 1, wherein the source is a hydraulic accumulator.

5. The vehicle of claim 1, wherein the electric motor is a high-voltage electric motor powered via a rechargeable energy storage system, the vehicle further comprising a belt, wherein the high-voltage electric motor is connected to the engine via the belt and is configured to restart the engine in response to receipt of a motor control signal from the controller.

6. The vehicle of claim 5, wherein the predetermined autostart event is a non driver-requested autostart event, and wherein the predetermined set of conditions triggering the autostart event includes a threshold low state of charge of the rechargeable energy storage system.

7. The vehicle of claim 1, wherein the autostart event is a non driver-requested autostart event, and wherein the predetermined set of conditions triggering the autostart event includes receipt of a heating, ventilation, and air conditioning request by the controller.

8. A vehicle comprising:
an internal combustion engine having non driver-requested autostart functionality;
an auxiliary pump operable to provide fluid pressure at a first level when the engine is off;
a flow control solenoid in fluid communication with the auxiliary pump that is configured to output a variable clutch pressure;
a transmission having a stationary member, a gear set, an output member, and a designated clutch in fluid communication with the flow control solenoid, wherein the designated clutch is applied via the variable clutch pressure at a second level to connect the gear set to the stationary member and establish a $1^{st}$ gear launch state of the transmission;
a hydrodynamic torque converter having an impeller connected to the engine and a turbine connected to an input member of the transmission;
a sensor configured to measure a rotational speed of the turbine;
a high-voltage rechargeable energy storage system (RESS);
a high-voltage electric motor powered via the high-voltage RESS, wherein the high-voltage electric motor and the high-voltage RESS are rated for at least 60 VDC and the high-voltage electric motor is connected to the engine via a belt;
drive wheels; and
a controller having a processor and tangible, non-transitory memory on which is recorded instructions for controlling the clutch pressure to the designated clutch during the non driver-requested engine autostart event, wherein execution of the instructions by the processor causes the controller to:
transmit a set of pulse width modulation (PWM) control signals to the flow control solenoid upon detection, by the controller, of a predetermined set of conditions triggering the non-driver requested autostart event to thereby lower the variable clutch pressure to the first level, including detecting an apply pressure to each of a brake pedal and an accelerator pedal and a state of charge of the high-voltage RESS;
command an automatic restart of the engine, including applying torque to the belt via the high-voltage electric motor;
determine the turbine speed by processing speed signals from the sensor, via the processor of the controller, while the engine is actively increasing in speed; and
discontinue transmitting the set of PWM control signals to the flow control solenoid while increasing the variable clutch pressure at a calibrated rate to full line pressure, thereby applying the designated clutch to connect a node of the gear set to the stationary member to transmit output torque from the output member of the transmission, via another node of the gear set, to the drive wheels and thereby launch the vehicle in $1^{st}$ gear when the turbine speed exceeds a calibrated threshold.

9. The vehicle of claim 8, wherein the predetermined set of conditions includes receipt by the controller of a heating, ventilation, and air conditioning request.

10. The vehicle of claim 8, further comprising an auxiliary power module (APM) in communication with the controller and electrically connected to the flow control solenoid.

11. The vehicle of claim 8, wherein the transmission includes a stationary member and a planetary gear set having a plurality of nodes, one of which is selectively connected to the stationary member via the designated clutch to establish a $1^{st}$ gear launch state of the vehicle.

12. A method comprising
detecting a set of conditions in a vehicle having a transmission and an engine with autostart functionality;
transmitting a set of pulse width modulation (PWM) control signals to a flow control solenoid in the transmission upon detection, by the controller, of the set of conditions, wherein the flow control solenoid is in fluid communication with a source of fluid pressure;
lowering a variable clutch pressure to a designated braking clutch of the transmission to a calibrated first level via the PWM control signals;
commanding an automatic restart the engine via an electric motor;
determining an input speed to the transmission while the engine is actively increasing in speed;
increasing the variable clutch pressure to a second level while engine speed is increasing; and discontinuing the set of PWM control signals to the control solenoid while increasing the variable clutch pressure at a calibrated rate to full line pressure when the input speed to the transmission exceeds a calibrated threshold such that the clutch pressure is set at the second level, thereby applying the braking clutch, wherein applying the braking clutch connects a node of a gear set of the transmission to a stationary member to transmit output torque, via another node of the gear set, to drive wheels of the vehicle via an output member of the transmission.

13. The method of claim 12, wherein the vehicle includes a hydrodynamic torque converter having an impeller connected to the engine and a turbine connected to an input member of the transmission, and an input speed sensor in communication with the controller, wherein determining the input speed includes measuring, via the sensor, a rotational speed of the turbine of the torque converter as the input speed.

14. The method of claim 12, wherein the source of fluid pressure is an auxiliary fluid pump.

15. The method of claim 12, wherein the source of fluid pressure is a hydraulic accumulator.

16. The method of claim 12, wherein the motor is a high-voltage electric motor that is connected to the engine via a belt, and wherein commanding an automatic restart of the engine via an electric motor includes transmitting a motor control signal from the controller to the high-voltage electric motor to thereby cause the high-voltage electric motor to deliver torque to the belt.

17. The method of claim 12, wherein the autostart event is a non driver-requested autostart event, and the set of conditions includes a threshold low state of charge of a rechargeable energy storage system that is electrically connected to the electric motor.

18. The method of claim 12, wherein the autostart event is a non driver-requested autostart event, and wherein the set of conditions includes receipt by the controller of a heating, ventilation, and air conditioning request.

19. The vehicle of claim 1, wherein the designated clutch is a $1^{st}$ gear braking clutch of the transmission that, when applied, connects a ring gear, a sun gear, or a planetary carrier of the gear set to the stationary member to launch the vehicle in $1^{st}$ gear.

20. The vehicle of claim 8, wherein the designated clutch is a $1^{st}$ gear braking clutch of the transmission that, when applied, connects a ring gear, a sun gear, or a planetary carrier of the gear set of the transmission to the stationary member to launch the vehicle in $1^{st}$ gear.

* * * * *